United States Patent [19]
Hanauer et al.

[11] 4,098,709
[45] Jul. 4, 1978

[54] POLYMERIC ANTIOXIDANT VISCOSITY INDEX IMPROVERS

[75] Inventors: Richard H. Hanauer, Furlong, Pa.; Gordon L. Willette, Kingston, N.J.

[73] Assignee: Rohm and Haas Company, Philadelphia, Pa.

[21] Appl. No.: 805,257

[22] Filed: Jun. 10, 1977

Related U.S. Application Data

[60] Continuation-in-part of Ser. No. 639,739, Dec. 11, 1975, which is a division of Ser. No. 541,973, Jan. 17, 1975, Pat. No. 3,951,831.

[51] Int. Cl.$^2$ .................. C10M 1/32; C10M 3/26; C10M 5/20; C10M 7/30
[52] U.S. Cl. ................ 252/51.5 A; 252/401; 526/16; 526/49
[58] Field of Search ............ 252/51.5 A, 401; 526/16, 49

[56] References Cited

U.S. PATENT DOCUMENTS

| | | | |
|---|---|---|---|
| 3,956,149 | 5/1976 | Coleman | 252/51.5 A |
| 4,027,081 | 5/1977 | Turner | 526/16 |
| 4,036,767 | 7/1977 | Yamamoto et al. | 252/51.5 A |
| 4,051,049 | 9/1977 | Elliott et al. | 252/51.5 A |

Primary Examiner—Delbert E. Gantz
Assistant Examiner—Irving Vaughn
Attorney, Agent, or Firm—Patric C. Baker

[57] ABSTRACT

Polymers containing post-reacted hindered phenol antioxidant functionality as viscosity index (VI) improvers for high temperature service, particularly for lubricating oils used in diesel engines.

12 Claims, No Drawings

POLYMERIC ANTIOXIDANT VISCOSITY INDEX IMPROVERS

RELATED APPLICATIONS

This application is a continuation-in-part of application Ser. No. 639,739, filed Dec. 11, 1975. The latter is a division of Ser. No. 541,973, filed Jan. 17, 1975, now U.S. Pat. No. 3,951,831.

BACKGROUND OF THE INVENTION

This invention relates to polymeric lubricating oil additives containing phenolic antioxidant groups, more particularly polymeric additives which combine effective antioxidant properties with viscosity index (VI) improvement in high temperature service.

It is well-known that lubricants tend to oxidize when exposed to adverse conditions. In the internal-combustion engine, the temperature of operation is an important variable since the oxidation rate increases with an increase in temperature. The formulation of lubricants to meet the most severe type of engine operation has been a great challenge, particularly in the area of multigraded oils for diesel engine applications. Additionally, with higher temperature experienced in gasoline engines resulting from use of pollution control equipment and a trend to small, high-revving engines, greater importance is now attached to more thermally and oxidatively stable lubricants for these applications. Thus, fluids which are conventionally conceived for mild diesel applications may find utility in the most severe gasoline engine operations.

Diesel engines, which are used to power a variety of heavy duty vehicles, such as trucks, buses, farm tractors, construction equipment and trains, generally impose severe high temperature service on lubricants. The temperatures in the upper ring belt zone of diesel pistons reach 500°–700° F in mild and high super-charged versions whereas temperatures in gasoline engines generally do not exceed 500° F.

Correct operation of the diesel engine requires that the piston be properly lubricated and remain free to travel unimpeded in the cylinder, compression being maintained by means of the secure-fitting rings located in the piston grooves. These rings act as lubrication pumps and must be able to move vertically as well as circumferentially in the groove. When the fluid is exposed to the high temperatures of the top groove, decomposition occurs proportionate to the thermal/oxidative stability of the components of the fluid. This decomposition results in resinous, carbonaceous deposits in the groove(s) and on the lands of the piston. If sufficient buildup of deposits occurs, ring sticking results with eventual compression loss, piston scuffing or piston seizure. Thus, an important element in the quality control for a diesel fluid is the specification of a maximum amount of deposit in the top groove and other locations.

Historically, single-grade oils have occupied a preeminent position as recommended fluids for diesel engine application, particularly 30 and 40 weight oils whose base stocks are less volatile than lower SAE grades and would be less likely to volatilize in the hot zones of the piston. Multigraded diesel oils have not achieved acceptance, although diesel engine operation in cold weather would indicate a significant advantage with multigrades. Diesel engines are usually difficult to start, especially in cold weather. The cold-start problems are now remedied (1) by the use of external heaters, an added expense and inconvenience; (2) by the use of ether, resulting in engine damage since this extremely volatile solvent provides an explosive start with piston movement in the absence of lubrication; or (3) by permitting continuous running when not in use, a situation which is wasteful of fuel and harmful from an environmental standpoint. Environmental and energy related considerations, therefore, could lead to a significant demand for multigraded diesel lubricants.

It is widely believed in the petroleum industry that the presence of polymer degrades diesel performance by increasing the amounts of Top Groove Fill (TGF) and lacquer. Their deficiency is the principal reason today that less than ten percent of the diesel lubricants used in this country are multigraded. For the major market, two performance levels are defined, Classification CC (Caterpillar 1-H) and Classification CD (Caterpillar 1-G), with the 1-G level representing more severe, highly super-charged, engine operation. For level CC, multigrade oils are available but they are not widely used due to higher costs and general reluctance to the use of polymer. Today, there are no multigraded level CD lubricants, and the technology for formulating them in a completely satisfactory way is not known. A new polymer providing completely acceptable multigraded 1-H and 1-G performance without introducing a severe cost penalty would represent a major breakthrough.

SUMMARY

We have now discovered novel VI improvers which provide a significant improvement in high temperature diesel engine operation. This advance has been achieved by incorporating hindered phenol antioxidant functionalities directly into suitable polymeric VI improvers. As such, the antioxidant moiety prevents extensive oxidative decomposition of the polymer and other fluid additives, thus reducing the tendency to lacquer, TGF formation and land deposits. Incorporation of the subject polymers of this invention in diesel lubricants greatly enhances the possibility of the adoption of multigraded oils for both mild and severe diesel operation.

The antioxidant polymers are formed by post-reacting a carboxylic acid containing VI improving polymer with a hindered phenol containing compound to obtain a polymer of the structure (I):

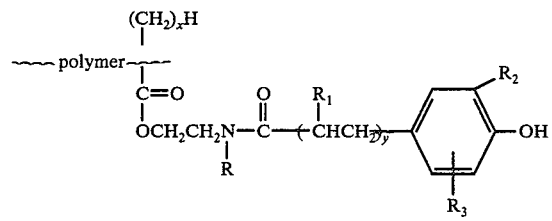

where $x$ is 0 or 1, R is H or $C_1$–$C_{12}$ alkyl, $y$ is 0 or 1, $R_1$ is hydrogen or methyl, $R_2$ and $R_3$ independently are $C_1$–$C_{12}$ alkyl, and the "polymer" backbone is the residue of the VI improving starting polymer.

DETAILED DESCRIPTION

The antioxidant-containing polymers of the invention are prepared via an esterification procedure indicated by the following general reaction, or by transesterification:

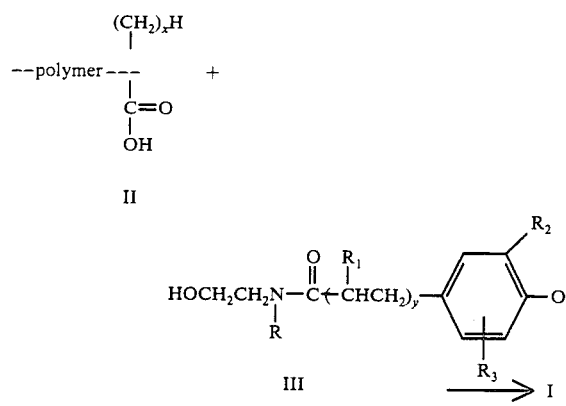

where the product I is as defined above.

The polymer backbone structure (II) may be formed from combinations of monomers commonly used to make oil soluble polymers as VI improvers. The following combination would be typical: copolymers of acrylic, methacrylic, maleic, fumaric or stearic acid with an oil solubilizing combination of oil soluble monomers, such as alkyl acrylates, alkyl methacrylates, styrene, alkylated styrenes, alkyl fumarates, alkyl itaconates, vinyl esters of fatty acids, ethylene, propylene, butenes and higher α-olefins. The polymer (II) should contain sufficient carboxylic acid monomer to provide for incorporation of the phenolic compound (III). About 0.5–10% by weight of methacrylic acid is effective but the amount may vary widely.

The phenolic reactant (III) typically is prepared from known hindered di-alkyl phenols such as 2,6-di-tert-.butylphenol by either of the following routes where MA is methyl acrylate, MMA is methyl methacrylate, and R, $R_2$ and $R_3$ are as defined above:

Procedure A:

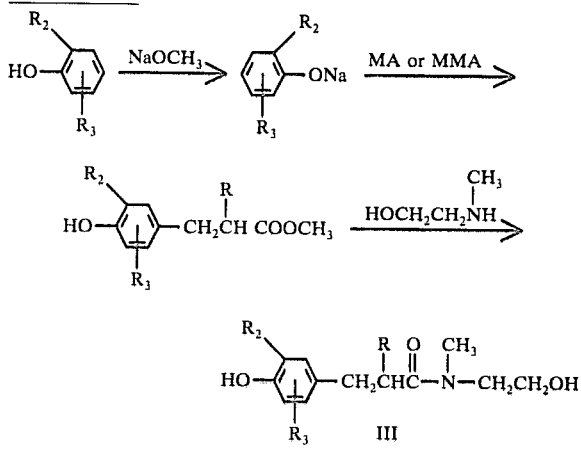

Procedure B:

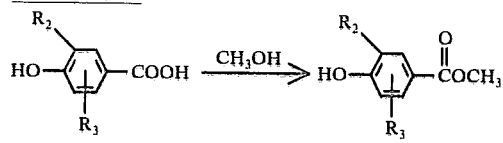

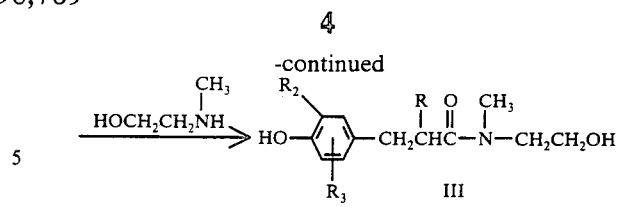

In place of N-methylethanolamine may be used other secondary amines such as N-ethyl, N-propyl or N-butyl ethanolamine. Reaction conditions are not critical and may be varied in accordance with well-known principles.

The esterification or transesterification of the carboxylic acid containing backbone polymer with the β-hydroxyamide phenolic product of Procedure A or B above is carried out in any suitable inert medium such as neutral oil, toluene, xylene, or heptane and under conditions effective to remove water as it is formed. The antioxidant polymer product may be separated from the reaction mixture or the reaction mixture may be used directly as a blending concentrate, desirably with further dilution with oil. The phenolic product is useful as a combined VI improver and antioxidant for any lubricating oil subject to oxidative degradation, whether mineral or synthetic, or blends thereof. Typically, from about 0.1% to about 10% by weight of the antioxidant polymer will be effective, a preferred range being about 2–6% by weight, and the polymer (I) will contain about 1–15% by weight of the phenolic reactant (III), preferably about 4–10% by weight.

British patent specification No. 1,283,103 discloses the incorporation of hindered phenol moieties into polymeric materials, the resulting compositions having use as anti-oxidants for various organic substances including mineral oils. Depending on the degree of polymerization the polymers are also said to be useful as VI improvers. The phenolic functionality is incorporated into the polymer by forming a monomer containing the antioxidant phenolic group and then producing the polymer by homopolymerization or copolymerization. Such approaches to phenolic anti-oxidant containing polymers raise serious difficulties. The phenolic antioxidant moiety tends to inhibit the polymerization, causing incomplete polymerization and gelation. In addition, the initiator for the polymerization must be carefully selected and the reaction conditions carefully controlled since the phenolic group causes competition between a phenolic/initiator reaction and the polymerizable double bond/initiator reaction.

The problems of the British patent are avoided with respect to the polymeric antioxidants of this invention because the phenolic functionality is incorporated into the polymer by forming a non-polymerizable phenolic compound having an alcoholic hydroxyl group and then esterifying the carboxyl groups of a carboxylic acid containing backbone polymer with the phenolic compound. The reactant is simple and unencumbered by competing reactions, requires no catalyst, and results in a product having a more random phenolic antioxidant distribution. Moreover, in contrast with the product of the British patent, the antioxidant content of the polymers of the invention is easily determined by titration of unreacted carboxylic acid functionality in the polymer backbone, thereby providing superior quality control over the product.

Most of the prior art of lubricant stabilization consists of the use of small molecule antioxidants. This method has long been popular because of the ease of blending a mixture of relatively inexpensive additives into an oil system. The use of small molecule stabilizing agents in high temperature applications, however, suffers from the disadvantage that the volatile stabilizing agent can easily escape from the system.

One method of making stabilizers for polymeric systems non-volatile is to chemically attach them to the target polymer. The use of polymeric antioxidants in the rubber industry has clearly demonstrated the advantages of polymer-bound antioxidants (Rubber Chem. Technol. 46,96 (1973), U.S. Pat. No. 3,658,769). These materials do not escape from the rubber during service yet maintain their activity for long periods of time.

The advantages of applying the use of non-volatile polymeric antioxidants in the lubricant systems of internal-combustion engines are apparent when one considers the very high temperatures that the lubricant can experience and the ease with which volatile small molecules can be lost from thin lubricant films. In addition, as polymer tends to concentrate in the piston grooves due to the flashing off of volatile oil components, the antioxidant moiety is simultaneously concentrated. This can be beneficial since the piston grooves are areas where anti-oxidant protection is most needed.

Another advantage of placing antioxidants in the polymer backbone is the solubility benifit. Most small molecule anti-oxidants, such as mercaptobenzothiazole, are highly polar and therefore oil soluble. In most cases, these functional groups can only be made soluble by attaching very long alkyl side chains such as $C_{18}$ (stearyl) groups. This method can be expensive and imparts much added weight to the antioxidant molecule. By attaching the antioxidant to an oil soluble viscosity index improver (which is already present in a multi-graded lubricant) via the use of a relatively short coupling moiety, the antioxidant can be kept in oil solution, even if the functional groups become more polar from oxidation. The post-reaction technique of esterifying methacrylic acid-containing copolymers with the phenolic βhydroxyamides is a useful method of antioxidant attachment through small chain segments. Attaching the functional group to a polymer instead of using long oil solubilizing side chains also helps avoid increases in the oil formulation viscosities at low temperatures by virtue of reducing the number of viscosity-contributing molecules in the system.

The process of esterifying carboxylic acid-containing viscosity index improvers with phenolic antioxidant compounds having a β-hydroxyamide "handle" offers numerous advantages over conventional methods of introducing phenolic antioxidant groups into high molecular weight polymers. Both the substrate acid-containing polymer and the β-hydroxyamide containing functional group can easily be made by well-known techniques. The post-reaction itself is a rapid, self-catalyzed esterification that can be carried out at moderate temperatures with minimum solvent. The only by-product of the reaction is water, which can be easily removed from the reaction system to help drive the esterification to virtually 100% completion. In addition, no catalyst fragments, such as acids, bases or inorganic salts, have to be removed. Crosslinking reactions do not occur; therefore, the molecular weight of the substrate polymer does not change during post-reaction. The post-reaction can be conducted in the presence of oil, which is a convenient solvent and diluent for viscosity index improvers. Conventional copolymerization methods suffer from the sensitivity of copolymerization reactions to the presence of a great many functional groups, such as inhibitors or chain transfer agents. Adding such groups to already formed polymer makes it easier to prepare high molecular weight polymer at high conversions using conventional polymerization catalysts and techniques.

The following examples will serve as further illustration of the invention, it being understood that such exemplification is not a necessary limitation on the spirit and scope of the invention. All parts and percentages are by weight unless otherwise indicated.

EXAMPLE 1

Part A: Preparation of N-(2-hydroxyethyl)-N-methyl-3,5-di tert.butyl-4-hydroxyphenyl propionamide To a 5000 cc round bottom flask under nitrogen was charged 618.0 g (3.0 moles) 2,6-di-t-butylphenol. To the molten phenol at about 40° C was added 18.0 g (0.33 mole) fresh sodium methoxide powder. The reaction mixture was heated to 75° C with stirring, then cooled back to 60° C. Then was added 284 g. (300 cc, 3.3 moles) methyl acrylate over a 30 minute period. The reaction exothermed and temperature was held at about 80° C with cooling. After the addition was completed the batch was heated 3 hours at 60° C. The reaction was then cooled to 50° C and 9.0 cc conc. $H_2SO_4$ was added with stirring as the temperature rose to 60° C. Unreacted methyl acrylate was removed by distillation at reduced pressure. The product was distilled at 128° –130° C (0.3 mm) and recrystallized from hexane to afford 714 g. white crystals, m.p. 66° C. The ester was converted to the aminoalcohol by heating the ester at 150° C for 3 hours with a 100% excess of N-methylethanolamine, while concurrently removing methanol. Excess amine was removed by vacuum distillation at 150° C. The stripped residue product was a sticky glass at room temperature. The yield was about 95%.

Part B: Preparation of Propionamide Hindered Phenol (PAHP) Polymer

A monomer mix of 1485 g. 98% dodecyl pentadecyl methacrylate, 45 g. methacrylic acid, 150 g. 100 neutral oil, 4.5 g. 50% para menthane hydroperoxide and 0.15 g. dodecyl mercaptan was charged over a 50 minute period at 117° C to a 5-liter flash which contained 4.5 g. 25% Kemamine fatty amine promoter and 300 g. 100 neutral oil. When all the monomer mix was in the flask, two more catalyst additions (each consisting of 2.25 g. 50% para menthane hydroperoxide, 2.25 g. 25% Kemamine promoter, and 75 g. 100 neutral oil) were made at 40 minute intervals. Forty minutes after the last catalyst addition, 600 cc. xylene and 184 g. of the N-(2-hydroxyethyl)-N-methyl-3,5-di-tert. butyl-4-hydroxyphenyl propionamide of Part A (1.05 equivalents on methacrylic acid) were added. The solution was then heated to 177° C and refluxed 2.5 hours, while removing water in a Dean-Stark trap. After water evolution had ceased, the xylene was removed under vacuum (3 mm Hg, 175° C maximum pot temperature) and the solution was diluted with 100 neutral oil to the 40% solids level.

A second, substantially identical run was made, using 0.3 g. dodecyl mercaptan in the monomer mix. Equal amounts of the polymeric product (PAHP) from each run were combined and used to obtain the improved antioxidant lube oil test results given in Table I below (blend 3). The polymeric products were also effective VI improvers.

TABLE I
CATERPILLAR 1-H ENGINE TESTS

| Oil Blend | Volume % Top Groove Fill<br>0 = Clean<br>100 = Fill | Top Land, % Area Clean<br>100 = Clean<br>0 = Fill | Overall Merit Rating<br>100 = Clean<br>0 = Fill |
| --- | --- | --- | --- |
| (1) Standard methacrylate polymer(4.57%) | 70 | 34 | 89.7 |
| (2) Standard methacrylate polymer(4.57%) + non-polymeric hindered phenol (0.5%)[1] | 53 | 11 | 89.1 |
| (3) Methacrylate polymer post-reacted with PAHP (4.57%) | 48 | 84 | 92.5 |

[1]Ethyl 702: 4,4'-methylenebis(2,6-di-tert.butylphenol)

EXAMPLE 2

Part A: Preparation of Methyl 3,5-di-tert.butyl-4-hydroxylbenzoate

In a 500 cc 1-necked, round bottom flask, fitted with a condenser and stirring bar, were placed under nitrogen: 37.55 g. (0.15 mole) 3,5-di-tert.-butyl-4-hydroxybenzoic acid, 7.5 g. Amberlyst 15 catalyst, and 300 cc (7.43 moles) methanol. The solution was refluxed 15 hours, after which time the hot solution was filtered, concentrated, and cooled to afford 31.9 g. (81%) white crystals which were washed with hexane and dried. The melting point was 165.0° -166.5° C. The infrared and NMR spectra of the product were consistent with those expected from methyl 3,5-di-tert. butyl-4-hydroxybenzoate.

Part B: Preparation of N-methyl-N-(α-hydroxyethyl)-3,5-di-tert. butyl-4-hydroxybenzamide In a 100 cc, 1-necked, round bottom flask fitted with a condenser and stirring bar were placed under nitrogen 25.0 g. (0.0945 mole) of the product of Part A and 50.0 g. (0.67 mole) N-methylethanolamine. The reaction mixture was heated in a 150° oil bath for 5 hours with a gentle reflux. The reaction product was then distilled at 63° C, 2.8 mm (120° C pot) until the head temperature began to rise. The brown, oily pot residue (20.3 g.) was recrystallized from CHCl$_3$)hexane and then ethyl acetate to afford 7.0 g. (24% yield) white needles, m.p. 161.0°-164.0° C.

Anal. Calc'd. for $C_{18}H_{29}NO_3$: C, 70.32; H, 9.50; N, 4.55; O, 15.61. Found: C, 70.11; H, 9.77; N, 4.41; O, 15.62.

Part C: Preparation of Carboxy Hindered Phenol (CHP) Polymer

The synthesis of Example 1, Part B was repeated in all essential respects except that the amount of dodecyl mercaptan in the monomer mix was 0.45 g. and 177 g. (1.1 equivalents) of N-methyl-N-(β-hydroxyethyl)-3,5-di-tert.-butyl-4-hydroxybenzamide was used in place of the N-(2-hydroxyethyl)-N-methyl-3,5-di-tert.-butyl-4-hydroxyphhenyl propionamide. The superior antioxidant performance of a lubricating oil containing the polymeric product (CHP) of this example if shown in Table II below (blend 2). The polymeric products were also effective VI improvers.

TABLE II
CATERPILLAR 1-G ENGINE TESTS

| Oil Blend | Volume % Top groove Fill<br>0 = Clean<br>100 = Fill | Top Land, % Area Clean<br>100 = Clean<br>0 = Fill | Overall Merit Rating<br>100 = Clean<br>0 = Fill |
| --- | --- | --- | --- |
| (1) Standard methacrylate polymer (4%) | 71 | 12 | 21.3 |
| (2) Methacrylate polymer post-reacted with CHP (4%) | 58 | 57 | 80.5 |

FEDERAL TEST METHOD STANDARD NO. 791 — METHOD 346.1

Caterpillar 1-H and 1-G Lubricant Evaluation

High Speed Superchanged Engine Evaluation Four Hundred and Eighty Hour Endurance Run

Introduction

The evaluation of the high temperature detergency and wear properties of the lubricant is accomplished by a high speed and load, diesel engine test, Caterpillar 1-H. This technique is essentially a modification of the Caterpillar 1-G test that has been used by industry for evaluation of Series 3 oils. The major difference between the 1H and 1-G procedures is somewhat reduced severity so that lower deposition levels result from the 1-H evaluation.

Equipment

A single-cylinder "Caterpillar" diesel test engine equipped with EX-7000 High Speed Changeover Group is used in the caterpillar 1-H test. This changeover group modifies the engine to a 5 ⅛ inches bore and 6 ½ inches stroke, and is installed on those engines built according to the EX-7500 engine arrangement.

Discussion

The Caterpillar 1-H evaluation is conducted to determine the effect of the lubricant on ring sticking, wear and accumulation of deposits during a 480-hour endurance run. This evaluation was run in accordance with the supercharged Caterpillar 1-H procedure, and the operating conditions were those specified for the supercharged test. A diesel fuel of 0.35% minimum sulfur content was used.

The Caterpillar 1-G evaluation was conducted to determine the effect of the lubricant on ring sticking, wear and accumulation of deposits during a 480-hour endurance run. This evaluation was run in accordance with the conditions specified in Caterpillar Test No. 1-G ASTM publication 509. The operating conditions were those specified for the supercharged test, and a fuel of 0.35% minimum sulfur content was used.

We claim:

1. A lubricant composition effective at high temperatures comprising (1) a major amount of a lubricating oil and (2) a minor antioxidant amount of a carboxylic acid-containing oil soluble polymer post-esterified with a hindered phenol antioxidant moiety and having the structure:

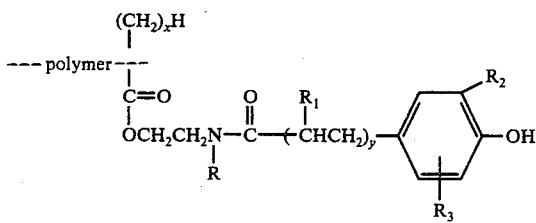

where $x$ is 0 or 1, R is H or $C_1$–$C_{12}$ alkyl, $y$ is 0 or 1, $R_1$ is H or methyl, and $R_2$ and $R_3$ independently are $C_1$–$C_{12}$ alkyl.

2. The lubricant of claim 1 wherein $x$ is 1, $y$ is 1, R is methyl, $R_1$ is H, and $R_2$ and $R_3$ are t-butyl.

3. The lubricant of claim 1 wherein $x$ is 1, $y$ is 0, R is methyl, and $R_2$ and $R_3$ are t-butyl.

4. The lubricant of claim 1 wherein the amount of (2) is about 1–10% by weight of the lubricant composition.

5. The lubricant of claim 1 wherein the hindered phenol antioxidant moiety comprises about 1–15% by weight of (2).

6. A polymeric antioxidant comprising a carboxylic acid-containing oil soluble polymer post-esterified with a hindered phenol antioxidant moiety and having the structure:

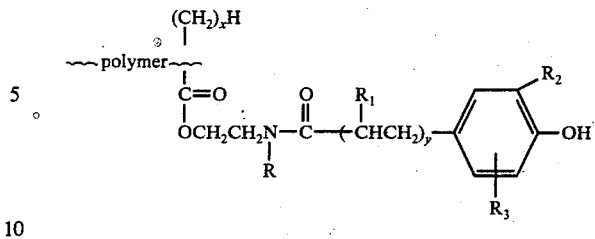

where $x$ is 0 or 1, R is H or $C_1$–$C_{12}$ alkyl, $y$ is 0 or 1, and $R_1$ is H or methyl, and $R_2$ and $R_3$ independently are $C_1$–$C_{12}$ alkyl.

7. The polymeric antioxidant of claim 6 wherein $x$ is 1, $y$ is 1, R is methyl, $R_1$ is H, and $R_2$ and $R_3$ are t-butyl.

8. The polymeric antioxidant of claim 6 wherein $x$ is 1, $y$ is 0, R is methyl, and $R_2$ and $R_3$ are t-butyl.

9. The polymeric antioxidant of claim 6 wherein the hindered phenol antioxidant moiety comprises about 1–15% by weight of (2).

10. A method of preparing the polymeric anti-oxidant of claim 6 comprising esterifying a carboxylic acid-containing oil soluble polymer with an N-alkyl ethanolamide antioxidant of the formula:

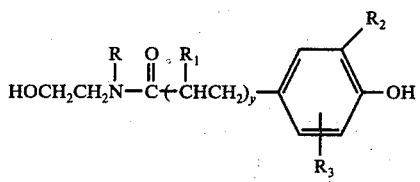

wherein

R is H or $C_1$–$C_{12}$ alkyl, $y$ is 0 or 1, $R_1$ is H or methyl, and $R_2$ and $R_3$ independently are $C_1$–$C_{12}$ alkyl.

11. The method of claim 10 wherein the carboxylic acid-containing polymer is prepared with methacrylic acid, $y$ is 1, R is methyl, $R_1$ is H, and $R_2$ and $R_3$ are t-butyl.

12. The method of claim 10 wherein the carboxylic acid-containing polymer is prepared with methacrylic acid, $y$ is 0, R is methyl, and $R_2$ and $R_3$ are t-butyl.

* * * * *